United States Patent
Pilkington et al.

(10) Patent No.: US 9,984,443 B2
(45) Date of Patent: May 29, 2018

(54) POLARIMETRIC MULTISPECTRAL CAMERA

(71) Applicant: Leonardo MW Ltd, Basildon (GB)

(72) Inventors: Roger Malcolm Pilkington, Basildon (GB); Gerald Wong, Basildon (GB); Robert A. Lamb, Basildon (GB); Peter Sinclair, Basildon (GB)

(73) Assignee: LEONARDO MW LTD, Basildon, Essex (GB)

( * ) Notice: Subject to any disclaimer, the term of this patent is extended or adjusted under 35 U.S.C. 154(b) by 0 days. days.

(21) Appl. No.: 15/021,500

(22) PCT Filed: Aug. 12, 2014

(86) PCT No.: PCT/EP2014/067232
§ 371 (c)(1),
(2) Date: Mar. 11, 2016

(87) PCT Pub. No.: WO2015/039816
PCT Pub. Date: Mar. 26, 2015

(65) Prior Publication Data
US 2016/0232649 A1    Aug. 11, 2016

(30) Foreign Application Priority Data

Sep. 19, 2013  (GB) .................................. 1316679.8

(51) Int. Cl.
*G06T 5/00*   (2006.01)
*H04N 5/33*   (2006.01)
(Continued)

(52) U.S. Cl.
CPC ............ *G06T 5/006* (2013.01); *G01J 3/0205* (2013.01); *G01J 3/0224* (2013.01);
(Continued)

(58) Field of Classification Search
CPC ....... G06T 5/006; G01J 3/0205; G01J 3/0224; G01J 3/0237; G01J 3/12; H04N 5/2254;
(Continued)

(56) References Cited

U.S. PATENT DOCUMENTS 6,677,999 B2 *  1/2004  Bean ..................... H04N 5/238
                                                    348/344
2005/0046865 A1 *  3/2005  Brock ................ G01B 9/02057
                                                    356/495
(Continued)

FOREIGN PATENT DOCUMENTS

CN           101526621 A       9/2009

OTHER PUBLICATIONS

International Search Report (PCT/ISA/210) dated Nov. 13, 2014, by the European Patent Office as the International Searching Authority for International Application No. PCT/EP2014/067232.
(Continued)

*Primary Examiner* — Nhan T Tran
(74) *Attorney, Agent, or Firm* — Buchanan Ingersoll & Rooney PC

(57) ABSTRACT

A camera for polarimetric, multispectral imaging is described. Such cameras are used in photonics, computational imaging and multispectral imaging in which both multispectral and polarimetric sensing modalities are used simultaneously for detection, recognition and identification. The camera enables multiple spectral images to be recorded simultaneously using polarizing beamsplitters and mirrors to divide the image according polarimetric and spectral bands. These multiple, polarized images are recorded on a single focal plane array (FPA) simultaneously. An image processor allows for the resolution of the subsequent image to be improved.

21 Claims, 2 Drawing Sheets

Figure 1:
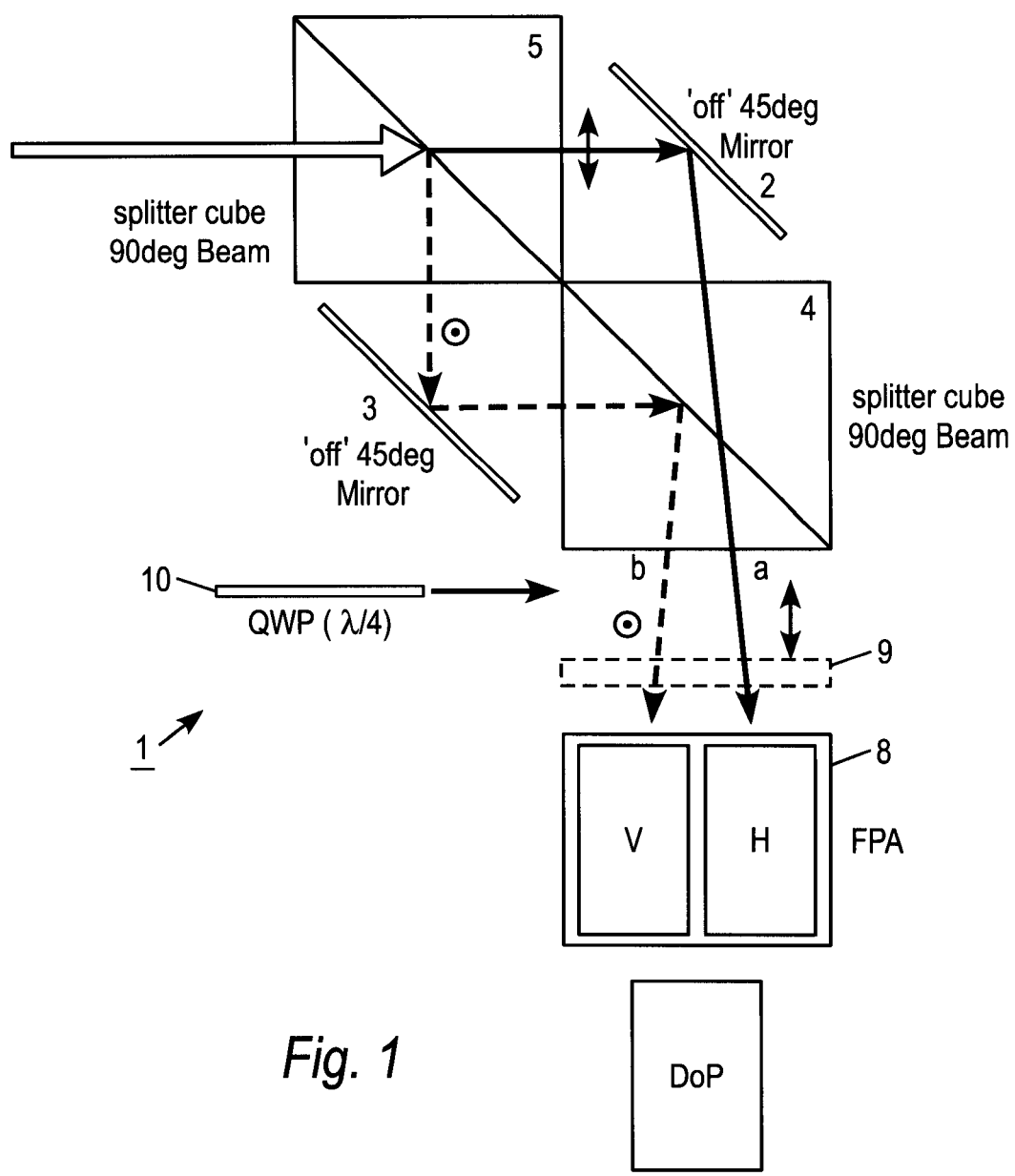

(51) Int. Cl.
    *G01J 3/02*     (2006.01)
    *G01J 4/04*     (2006.01)
    *G01J 3/12*     (2006.01)
    *G01J 3/28*     (2006.01)
    *G06T 3/40*     (2006.01)
    *H04N 5/225*     (2006.01)
    *H04N 5/232*     (2006.01)
    *H04N 9/64*     (2006.01)
    *H04N 17/00*     (2006.01)
    *G06T 7/90*     (2017.01)
(52) U.S. Cl.
    CPC .............. *G01J 3/0237* (2013.01); *G01J 3/12* (2013.01); *G01J 3/2823* (2013.01); *G01J 4/04* (2013.01); *G06T 3/4053* (2013.01); *G06T 7/90* (2017.01); *H04N 5/2254* (2013.01); *H04N 5/23232* (2013.01); *H04N 5/23293* (2013.01); *H04N 5/33* (2013.01); *H04N 9/646* (2013.01); *H04N 17/002* (2013.01); *G01J 2003/1234* (2013.01); *G01J 2003/2826* (2013.01); *G06T 2207/20024* (2013.01); *G06T 2207/30168* (2013.01)
(58) Field of Classification Search
    CPC . H04N 5/23293; H04N 5/23232; H04N 9/646

USPC .............................. 348/144, 146, 218.1, 343
See application file for complete search history.

(56) References Cited

U.S. PATENT DOCUMENTS

| | | | |
|---|---|---|---|
| 2005/0225761 | A1 | 10/2005 | Gerhart et al. |
| 2007/0041014 | A1 | 2/2007 | Gerhart et al. |
| 2007/0211256 | A1* | 9/2007 | Medower .............. G06T 7/0057 356/491 |
| 2007/0211333 | A1* | 9/2007 | Kaminsky .......... G01N 21/6458 359/386 |
| 2008/0165359 | A1 | 7/2008 | Mattox et al. |
| 2008/0296482 | A1* | 12/2008 | Lee ...................... A61B 5/0059 250/234 |
| 2009/0147238 | A1 | 6/2009 | Markov et al. |
| 2012/0176505 | A1 | 7/2012 | Kim et al. |
| 2013/0038877 | A1* | 2/2013 | Nelson ...................... G01J 3/32 356/417 |
| 2013/0136306 | A1 | 5/2013 | Li et al. |

OTHER PUBLICATIONS

Written Opinion (PCT/ISA/237) dated Nov. 13, 2014, by the European Patent Office as the International Searching Authority for International Application No. PCT/EP2014/067232.

* cited by examiner

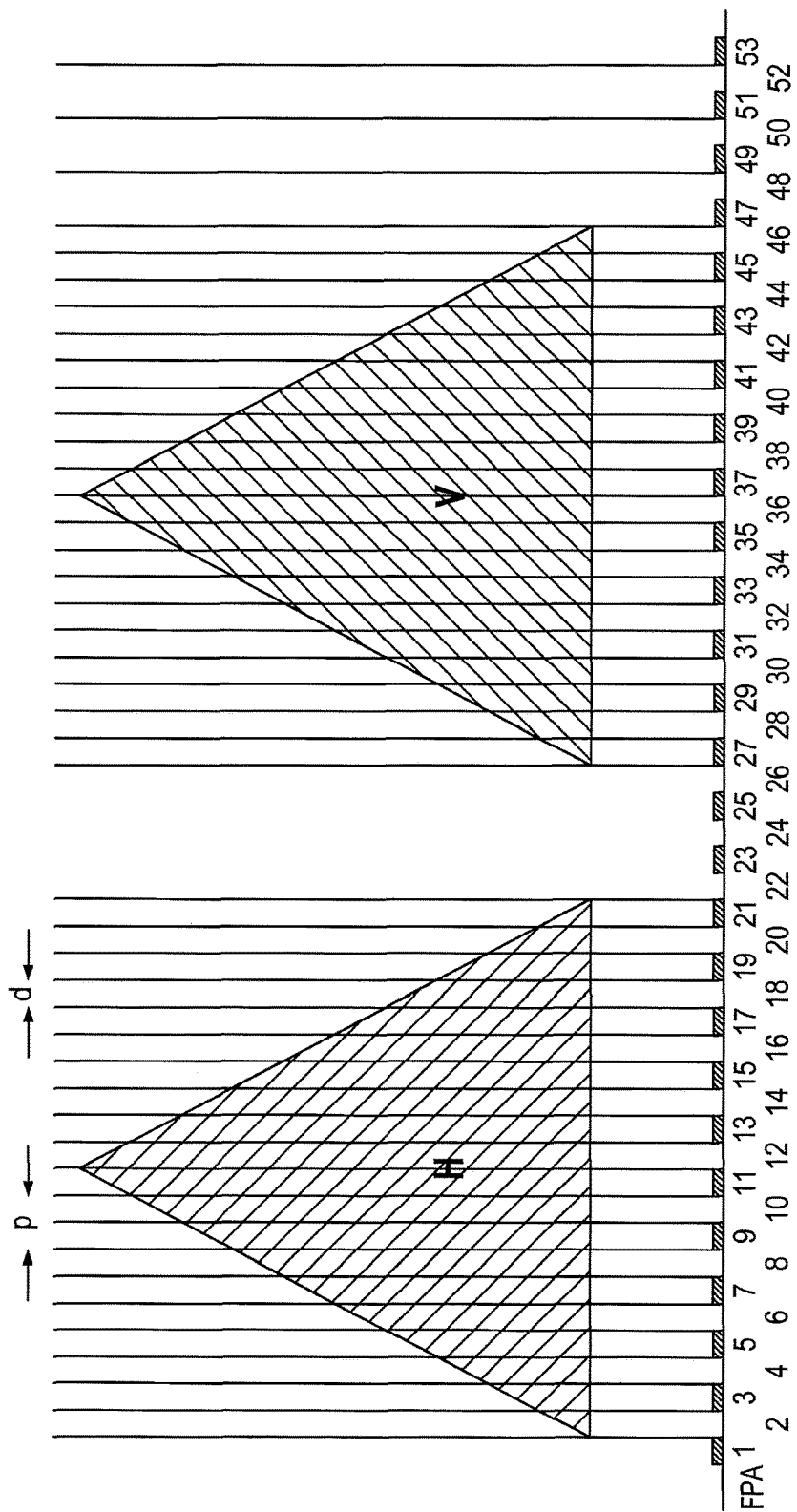

POLARIMETRIC MULTISPECTRAL CAMERA

The present invention relates to cameras, in particular, but not exclusively it relates to a camera for polarimetric, multispectral imaging and a method of using such a camera. The present invention relates to cameras used in photonics, computational imaging and multispectral imaging in which both multispectral and polarimetric sensing modalities are used simultaneously for detection, recognition and identification.

Known forms of multispectral cameras record images using a sequence of spectral filters or a scanned dispersive element. This means that a complete data set (cube) is recorded over time. Similarly, polarimetric images may be recorded using polarisers which are changed between frames. This limits these techniques to scenes in which relative movement between the object and camera is slow to minimise the effect of latency.

There are also imaging products which seek to record polarimetric or multispectral data separately with reduced latency. However, these rely on designs optimised for either sensing modality, but not simultaneously.

Imaging products in a small sensor packages are becoming increasingly difficult to design with adequate performance for very long range targeting and surveillance applications. The image quality of conventional camera systems is degraded due to atmospheric turbulence. Furthermore, the high optical magnification and large collection apertures that are required to overcome diffraction and increase image brightness result in large and complex optics.

Such imaging products need to provide sufficient spatial resolution suitable for target recognition and identification are therefore bulky systems and are incompatible with the size and weight restrictions for future airborne platforms, both manned and unmanned.

Techniques which do not rely on providing a resolved image of an object, yet which can provide information on the form and class of the object, are increasingly important. These single pixel or "few-pixel" sensing systems do not require high resolution optics so can be smaller, lighter and cheaper. Examples of such techniques are polarimetric sensing and spectral sensing. Light from scenes is generally unpolarised except where man-made materials are present. This polarisation can be measured and used to locate, differentiate and identify objects. In spectral techniques, seemingly similarly coloured materials such as vegetation and camouflage nets actually vary in their detailed spectra which again can be measured at a number of wavelengths (multispectral) and used in object identification.

According to the invention there is provided a camera for capturing images of target, the camera comprising a focal plane array having an array of pixels, the camera further comprising means to simultaneously record multiple polarised images of the target together with multispectral data, pixel resolution, array pitch and relative speed of the target, the camera having a predetermined spectral bandwidth determined by an optical filter.

The Polarimetric Multispectral Camera of the present invention combines the two techniques above and is aimed at providing a future compact sensing product for longer range targeting and surveillance.

A particular advantage is apparent over the more conventional line scanning spectral systems which rely on having an accurate navigation solution in order to post-process the data. No such navigation dependency is required in the present invention. The Polarimetric Multispectral Camera then has the prospect of offering a simpler, lower cost product than those currently provided.

In the present invention multiple spectral images are recorded simultaneously using polarising beamsplitters and mirrors to divide the image according polarimetric and spectral bands and allowing these images to be recoded on a single focal plane array (FPA) simultaneously.

In the first and second embodiment of the invention, the spectral filters are in the form of a 1D linearly variable filter aligned such that the direction of wavelength change is parallel to the grid pattern of the imaging array. Relative movement in the scene may then be used to advantage: the movement causing the object to be scanned across the filter and sampled in different bands. In this way, the filter and beamsplitters generate larger images compared to those previously known systems such as that disclosed in GB Patent application number 0215248.6.

In the third and fourth forms of the invention, a 2D mosaic filter pattern is used to record multi-spectral data on a single frame without the need for relative motion and therefore with no latency.

The invention will now be described with reference to the following drawings in which:

FIG. 1 shows a simplified schematic of one form of the invention, the camera 1 comprising two mirrors 2, 3 and two beamsplitters 4,5 (the refractive effects being suppressed for clarity), in which 'V' is vertical polarisation, 'H' is horizontal polarisation and DoP' is a computed degree of polarisation. The ray paths indicate two linear polarisation states a, b. A modification is the insertion of a multi-order quarter wave plate ($\lambda/4$) (not shown) in front of the FPA to covert the linearly polarisation states to circularly polarised states; and FIG. 2 shows the image of a triangle divided into two by the polarising beam splitter arrangement of FIG. 1, thereby producing horizontal (H) and vertically (V) polarised images. The pixel pitch is assumed to be equal to the pixel width and therefore a n×n FPA has a fill factor of $n^2/(2n-1)^2$. The pixels are odd-numbered and the spaces between the pixels are even-numbered. The sum of the pixel width (d) and the separation between neighbouring pixels (also assumed to be d) is the pitch, p=2d. If the images are separated on the FPA by a distance md, where m is an odd integer (in the example of FIG. 2, m=5) then the two images, when combined, are sampled without aliasing. Therefore, the corresponding parts of the two images are sampled and a complete image is obtained.

As can be seen from the above Figures, the two images are generated by a pair of polarising beamsplitters 4, 5 which divide the image into two identical images 6, 7 of orthogonal polarisations that are simultaneously projected onto a FPA 8. The FPA 8 records the two images 6, 7, treating them as one complete frame read-out. This provides polarised images 6, 7 which may be analysed to obtain polarimetric information in the scene and, thereby, locate objects that exhibit a polarimetric signature. For example, the Degree Of Polarisation (DoP) can be computed.

To derive multispectral information a spatially varying colour filter 9 is sited at an intermediate imaging plane or on the FPA 8. The filter 9 provides identical filtration for corresponding pixels in each image and may be 1D (i.e. linear) or 2D.

In one form of this invention, two images 6, 7 are generated and cast onto the FPA 8. This means that the intrinsic spatial resolution of each image 6, 7 is reduced by up to a factor of two since they are reduced in size to fit the area of the FPA 8. However, this reduction in resolution can be mitigated if the images 6, 7 are positioned on the FPA 8 with consideration given to the pixel pitch, pixel size and image separation.

As can be seen from FIG. 1, two polarising beamsplitters 4, 5 and mirrors 2, 3 are used to create a 1×2 array of images of orthogonal polarisation i.e. H and V. The beamsplitters 4, 5 and mirrors 2, 3 are located within the optical system. Although image distortion is reduced by conventional optical design, residual aberration may be corrected electronically using existing digital algorithmic processing techniques. This ensures that the two images are accurately registered. Calibration of the FPA 8 is required to remove fix pattern noise and any variation in pixel sensitivity in the FPA 8.

A colour filter 9 consisting of a spatially varying, wavelength dependant transmission and exhibiting mirror symmetry, i.e. a 1D spatially varying filter (1DSVF) is sited at an intermediate image plane or immediately in front of the FPA 8. Accurate alignment of the filter 9 with the two registered images 6, 7 ensures that each corresponding pixel in each of the images 6, 7 has the same wavelength filtration. Accurate registration of these images 6, 7 also ensures that they are identical in spatial content but of opposite polarisation (H and V). Insertion of a quarter waveplate (QWP) 10, as shown in FIG. 1, converts the linearly polarised light to right circularly polarised (RCP) and left circularly polarised (LCP) light. This optimises detection of targets that have a predominantly circularly polarised signature. Compared to the existing systems, these images are of greater spatial resolution because they are larger and have a spectral resolution determined by the spatial resolution of the filter 9. This compares with known systems in which spectral resolution is determined by dispersion and where additional spectral resolution can only be obtained with additional Wollaston prism pairs, thus increasing the number of images and thereby reducing their size to fit onto the FPA.

For example, consider a high altitude surveillance application where the camera is fitted with a 1DSVF and is looking vertically down from an aircraft travelling at speed $V_T$ observing a single pixel ground target from an altitude h. If the ground speed of the target is $V_g$ and the focal length of the lens in the camera, f, then:

$$f_{r,max} = \frac{(V_T \pm V_g)}{h} \frac{f}{\delta p},$$

where $f_{r,\,max}$ is the maximum frame rate of the camera and $\delta p$ is the pixel size. The choice of sign depends on whether the ground target is moving with or against the aircraft. If the frame rate of the camera exceeds $f_{r,\,max}$ then the target is sampled more than once by the same pixel between frames.

If the wavelength chirp for a 1D filter is $\lambda'$, then the wavelength of the filter sampling the target is:

$$\lambda = \lambda_0 + \frac{N\lambda' f(V_T \pm V_g)}{f_r h},$$

where N=1 for 1 pixel row per frame.

It should be noted that strictly, VT is the component velocity parallel to grid pattern of the imaging array and direction of wavelength chirp of the 1DSVF. Furthermore, strictly, Vg is the component velocity parallel to grid pattern of the imaging array and direction of wavelength chirp of the 1DSVF.

For the case where a 2 DSVF is used, relative motion is not exploited and multi-spectral data may be recorded of static targets in a similar manner to that which uses a Bayer filter, which is identified as prior art.

Since more than one image 6, 7 is displayed on the FPA 8, the spatial resolution of the images is reduced compared to that offered by a single large image on the FPA 8. This can be mitigated as follows. The pixel size and separation determine the sampling interval and fill factor of the FPA 8. The spatial resolution can be improved by up to a factor of two if the images 6, 7 are separated by a distance equal to an even number of pixels. FIG. 2 shows how the images should be positioned in the image plane where the FPA 8 is located. The arrangement shown ensures that that part of the image which is not sampled for one polarisation (and is therefore missing) is sampled in the other image but in the orthogonal polarisation. The images may then be "stitched" together with the consecutive samples of one image interleaved with those of the other. Perfect alignment and complementary sampling (i.e. m is odd in FIG. 2) then form a contiguous sampling with a near 100% fill factor in both the rows (horizontal plane) and the columns (vertical plane) of the array. For a scene in which the background is unpolarised but the target exhibits a polarimetric signature, the contiguous image has higher spatial resolution for the background.

The optimum positioning of the images on the FPA 8 depends on their size. FIG. 2 shows the case for large, resolved images covering a significant area of the FPA 8. For the case where the image is very small and comprises only one pixel (i.e. a point image) the opposite argument applies. It is then desirable (or necessary) to ensure that each "image" is sampled and therefore each must be aligned onto a pixel, thus the separation must be such that m is an even integer.

In general, the object of interest might generate sub-pixel or resolved images depending on the range and magnification. Alignment of the images must therefore be switchable between odd and even m to within an accuracy better than d. There are several techniques for aligning the images to within an accuracy determined by the pitch p these are well known in the published literature and constitute prior art.

It will be appreciated that the invention is not limited to the technical field of the embodiment described and that the simplified and lower cost solution proposed by the invention opens possibilities for other commercial applications including but not limited to colour inspection and sorting, recycling, geology, forensics, food processes (sorting and quality inspection), and remote sensing.

These application areas are highly cost sensitive so may be attractive for such a product.

The invention claimed is:

1. A camera for capturing images of target, the camera comprising:
    a focal plane array (FPA) of pixels, and
    means to simultaneously record multiple polarised images of a target on the FPA whilst also recording multispectral data, pixel resolution, array pitch and speed of the target relative to a scene, the camera having a predetermined spectral bandwidth determined by an optical filter,
    wherein the optical filter is sited in an intermediate image plane in front of the FPA such that a spectral resolution of the image is determined by a spatial resolution of the optical filter.

2. A camera according to claim 1 in which the camera comprises:

means for generating two separate polarised images of a target, the means for generating the images having two mirrors and two beamsplitters in an optical path of the camera, such that the two images will be incident on the FPA.

3. A camera according to claim 1 in which the images will be recorded as horizontally and vertically polarised images of a target.

4. A camera according to claim 1 in which the images to be recorded will be right and left circularly polarised images.

5. A camera according to claim 1 in which the filter is a 1D spatially varying filter.

6. A camera according to claim 1 in which the camera comprises:
   image processing means, the image processing means being configured for correcting for errors including at least one of pixel aliasing, the image processing means acting so as to align recorded images on to the focal plane array thereby recovering loss in resolution caused by reduction in size of images required to project two images simultaneously on to the FPA.

7. A camera according to claim 2 in which the images will be recorded as horizontally and vertically polarised images of a target.

8. A camera according to claim 2 in which the images will be recorded as right and left circularly polarised images.

9. A camera according to claim 2 in which the filter is a 1D spatially varying filter.

10. A camera according to claim 3 in which the filter is a 1D spatially varying filter.

11. A camera according to claim 4 in which the filter is a 1D spatially varying filter.

12. A camera according to claim 8 in which the filter is a 2D pixelated filter mask, the bandwidth being determined by colour filtration of the filter mask, such that no relative movement between the camera and the target is required.

13. A camera according to claim 2 in which the filter is a 2D pixelated filter mask, the bandwidth being determined by colour filtration of the filter mask, such that no relative movement between the camera and the target is required.

14. A camera according to claim 4 in which the filter is a 2D pixelated filter mask, the bandwidth being determined by colour filtration of the filter mask, such that no relative movement between the camera and the target is required.

15. A camera according to claim 5 in which the filter is a 2D pixelated filter mask, the bandwidth being determined by colour filtration of the filter mask, such that no relative movement between the camera and the target is required.

16. A camera according to claim 12 in which the camera comprises:
   image processing means, the image processing means being configured for correcting for errors including at least one of pixel aliasing, the image processing means acting so as to align recorded images on to the focal plane array thereby recovering loss in resolution caused by reduction in size of images required to project two images simultaneously on to the FPA.

17. A camera according to claim 2 in which the camera comprises:
   image processing means, the image processing means being configured for correcting for errors including at least one of pixel aliasing, the image processing means acting so as to align recorded images on to the focal plane array thereby recovering loss in resolution caused by reduction in size of images required to project two images simultaneously on to the FPA.

18. A camera for catching images of a target, the camera comprising:
   a focal plane array (FPA) of pixels, and
   means to simultaneously record multiple polarised images of a target on the FPA whilst also recording multispectral data, pixel resolution, array pitch and speed of the target relative to a scene, the camera having a predetermined spectral bandwidth determined by an optical filter, in which the filter is a 2D pixelated filter mask, the bandwidth being determined by colour filtration of the filter mask, such that no relative movement between the camera and the target is required,
   wherein the optical filter is sited in an intermediate image plane in front of the FPA such that a spectral resolution of the image is determined by a spatial resolution of the optical filter.

19. A method of capturing an image of a target using a camera having a pixel array and an optical filter, wherein the optical filter is sited in an intermediate image plane in front of the FPA, the method comprising:
   a. calibrating and correcting sub-images on the array;
   b. extracting sub-image data from a full frame including at least array pitch and speed of the target relative to a scene;
   c. calibrating a degree of polarisation of the image using a computational algorithm;
   d. colour coding the degree of polarisation;
   e. displaying a colour coded polarised image on a display; and
   f. calculating colour filtration required according to filter calibration and specification, wherein a spectral resolution of the image is determined by a spatial resolution of the optical filter.

20. A method according to claim 19 in which the computational algorithm applied is of a form:

$$\frac{H-V}{H+V}$$

or $$\tan^{-1}\left(\frac{H}{V}\right)$$

where H and V are signal values of corresponding pixels in horizontally and vertically polarised sub-images.

21. A method according to claim 19 comprising:
   storing spectral data for subsequent analysis and use by users of other computational schemes.

* * * * *